J. DEMPSTER.
ROACH TRAP.
APPLICATION FILED FEB. 3, 1912.
1,024,767.
Patented Apr. 30, 1912.
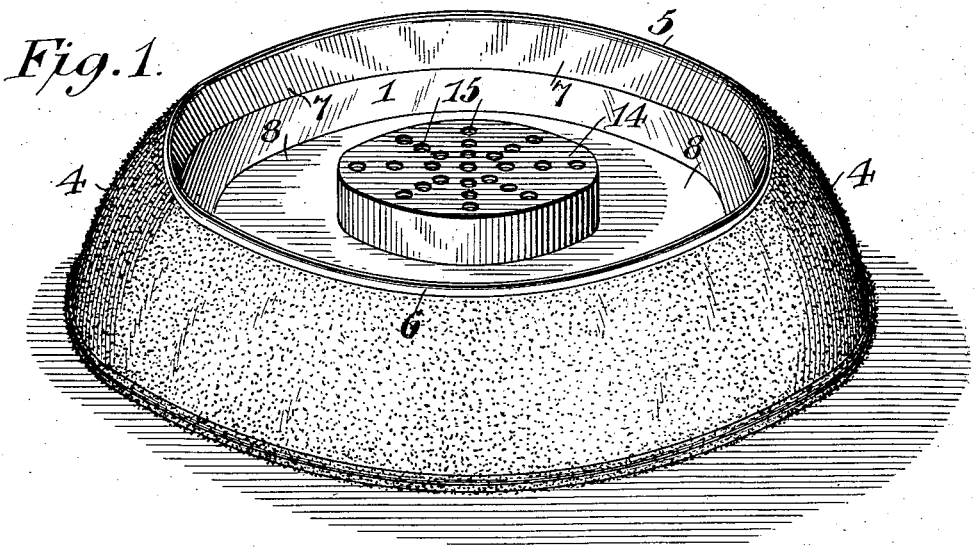
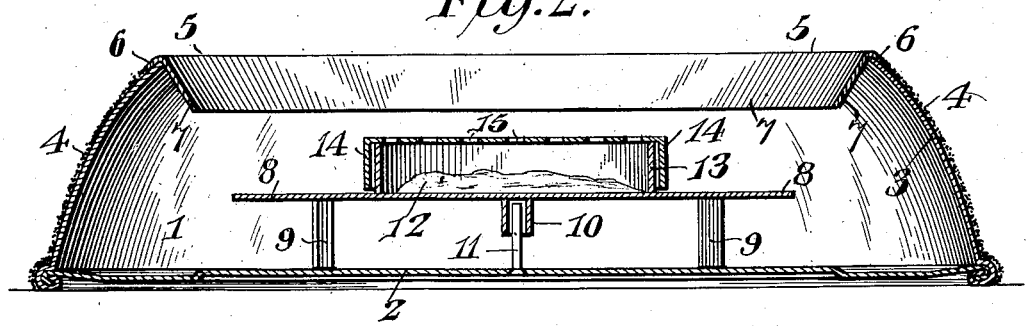
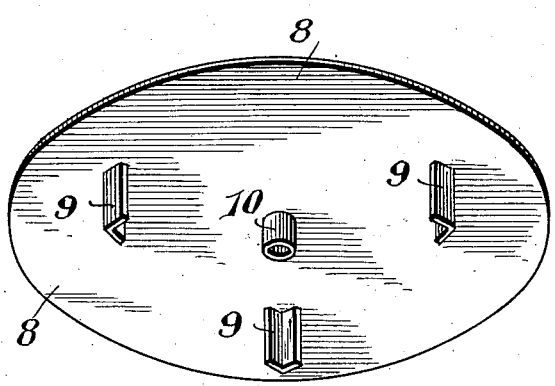
WITNESSES
John Dempster, INVENTOR
BY
ATTORNEY

UNITED STATES PATENT OFFICE.

JOHN DEMPSTER, OF KNOXVILLE, TENNESSEE.

ROACH-TRAP.

1,024,767.  Specification of Letters Patent.  Patented Apr. 30, 1912.

Application filed February 3, 1912. Serial No. 675,367.

*To all whom it may concern:*

Be it known that I, JOHN DEMPSTER, a citizen of the United States, residing at Knoxville, in the county of Knox and State of Tennessee, have invented a new and useful Roach-Trap, of which the following is a specification.

The invention relates to improvements in roach traps.

The object of the present invention is to improve the construction of roach traps, and to provide a simple, inexpensive and efficient roach trap, designed particularly for catching the black cock roach, which infests the south, and being of shallow open construction adapted to cause such insects to walk designedly into it, and capable of effectually preventing such insects from escaping from it.

A further object of the invention is to provide a trap of this character, adapted to enable the captured insects to be readily scalded or otherwise destroyed, and to permit the dead insects to be easily emptied from it.

With these and other objects in view, the invention consists in the construction and novel combination of parts hereinafter fully described, illustrated in the accompanying drawing, and pointed out in the claim hereto appended; it being understood that various changes in the form, proportion, size and minor details of construction, within the scope of the claim, may be resorted to without departing from the spirit or sacrificing any of the advantages of the invention.

In the drawing:—Figure 1 is a perspective view of a roach trap, constructed in accordance with this invention. Fig. 2 is a central vertical sectional view of the same. Fig. 3 is a detail perspective view of the removable bait holding platform, showing the lower face thereof.

Like numerals of reference designate corresponding parts in all the figures of the drawing.

In the accompanying drawing in which is illustrated the preferred embodiment of the invention, 1 designates a shallow receptacle constituting the body of the trap and having a horizontal bottom 2 and inclined walls 3, extending upwardly and inwardly and preferably curved slightly, as shown. The walls 3, which are imperforate, have exposed outer faces and converge upwardly. The receptacle, which is shown circular, may be square, or any other preferred form, and it may be constructed of sheet metal, or other suitable material. The inclined walls 3 have smooth inner faces to prevent insects from crawling up the walls and escaping from the trap, and the outer faces 4 are roughened to enable cock roaches to crawl readily up the inclined sides of the trap. The rough outer faces 4 consist of a coating of sand, but the exterior of the walls of the body of the trap may be roughened in various other ways.

Supported upon the upper edges of the inclined walls of the receptacle or body of the trap is a removable ring or rim 5, consisting of angularly related outer and inner inclined flanges 6 and 7, forming a groove to receive the upper edges of the walls of the body or receptacle. The outer flange 6 is relatively short, and the inner flange 7, which extends downwardly and inwardly into the trap at a sharp incline, has a smooth upper face, and it is spaced from a removable platform 8 a distance sufficiently short to enable an ordinary black cock roach crawling on the flange to reach the platform with its feelers before actually leaving the flange, the smooth upper surface of the flange as well as its inclination being sufficient to prevent a roach from escaping from the trap after entering the same. The smooth flange does not operate to slide or precipitate the roaches into the trap, but prevents them from obtaining a sufficient grip or hold on it to draw themselves up from the platform onto the flange.

The platform 8, which is arranged centrally of the receptacle or body about an inch below the plane of the lower edge of the inclined flange 7, forms a shallow false bottom and is supported by legs 9, and it is centered by means of a depending hollow substantially cylindrical shell 10, forming a socket to receive a centrally arranged vertical pin or post 11. In practice the platform will be approximately six inches in diameter, and the diameter of the ring or rim at the lower edge of the inner flange 7 will be substantially six and three quarter inches. The platform may be any distance above the bottom of the trap as this is not material except that in practice, the height of the trap will be in the neighborhood of two and one half inches, so that the trap will present the appearance of a shallow pan having a large open top, so as not to deter roaches from entering the trap as it is well known that roaches will not freely enter a high receptacle. The platform is of less diameter than the opening of the rim or ring so that while within easy reach and not interfering with the entrance of roaches into the trap, there will be great difficulty for roaches to escape, and roaches in attempting to climb up the smooth inclined flange of the ring or rim will be precipitated into the bottom of the trap, as hereinafter fully explained.

The socket or shell 10 is soldered or otherwise secured to the platform, and the pin or post 11 is secured at its lower end to the bottom at the center thereof, and when the shell is fitted over the upper end of the pin or post, the platform will be centered within the trap. The legs are suitably secured to the lower face of the platform, and the receptacle or body of the trap is sufficiently deep to provide a relatively large space below and beyond the platform to contain a comparatively large number of insects.

In a trap designed to catch roaches, I have ascertained by experiments that the trap must have no small dark openings, through which the roach is compelled to crawl before it is trapped. My trap is designed to inspire confidence in the roach, as the platform is within reaching distance of the roach when at the top of the trap or on the inclined flange. Moreover, as the diameter of the opening defined by the lower edge of the flange 7 is only slightly less than the diameter of the receptacle and is greater than the diameter of the platform, it results that the interior of the trap is lighted, which operates as a further inducement to the roach to enter. When, however, the roach has entered and is upon the platform, it will be impossible for the roach to escape. Roaches reaching from the platform to the smooth inner flange 7 are caused to assume an inclined position, and in attempting to crawl up the flange 7 will swing under the same to a vertical position, and will be unable to get back upon the platform and consequently fall into the bottom of the trap. Should, however, the insect get its feelers over the top of the flange 7 in an attempt to draw itself up from the platform, as soon as this is attempted the weight of the insect is no longer supported, and the insect swings outward beyond the platform and being unable to get sufficient grip on the top of the trap to pull itself up without the assistance of its hind legs, is compelled to drop back into the bottom of the trap.

The platform is adapted to hold a suitable bait 12 for attracting roaches, and it is provided with a vertical annular flange or wall 13, on which is fitted a removable cylindrical cap 14, preferably constructed of sheet metal and provided with perforations 15. The cap with its perforations exposes the bait sufficiently to attract the roaches, and at the same time prevents the same from reaching the bait and becoming smeared with the same, which might assist their escape from the trap.

What is claimed is:—

A roach trap comprising a receptacle having a flat horizontal bottom, an upwardly converging imperforate wall, said wall being provided at the top with a downwardly and inwardly sharply inclined smooth narrow flange, a platform supported centrally within the receptacle upon the bottom with its top in a substantially horizontal plane between the lower edge of the flange and the bottom, said platform being within reaching distance of the roach from the top of the trap so that it will enter the trap designedly, the marginal flange defining at its lower edge a central opening of a diameter slightly less than that of the receptacle and greater than the diameter of the platform, whereby a roach may pass over the interspace from the flange to the platform and from the platform to the bottom downwardly but cannot pass from the platform to the flange upwardly, and a bait receptacle arranged centrally on the platform and provided with a cover having openings for exposing the bait.

In testimony, that I claim the foregoing as my own, I have hereto affixed my signature in the presence of two witnesses.

JOHN DEMPSTER.

Witnesses:
JOHN H. SIGGERS,
EDITH L. BROWN.